US 11,780,433 B2

United States Patent
Takaki

(10) Patent No.: US 11,780,433 B2
(45) Date of Patent: Oct. 10, 2023

(54) SYSTEMS AND METHODS FOR SELECTIVELY MODIFYING COLLISION ALERT THRESHOLDS

(71) Applicant: DENSO CORPORATION, Kariya (JP)

(72) Inventor: Ryo Takaki, Southfield, MI (US)

(73) Assignee: DENSO CORPORATION, Aichi (JP)

(*) Notice: Subject to any disclaimer, the term of this patent is extended or adjusted under 35 U.S.C. 154(b) by 154 days.

(21) Appl. No.: 17/076,020

(22) Filed: Oct. 21, 2020

(65) Prior Publication Data

US 2022/0118970 A1   Apr. 21, 2022

(51) Int. Cl.
| | |
|---|---|
| B60W 30/095 | (2012.01) |
| G08G 1/16 | (2006.01) |
| G06K 9/00 | (2022.01) |
| B60Q 9/00 | (2006.01) |
| G06V 20/58 | (2022.01) |

(52) U.S. Cl.
CPC .......... *B60W 30/095* (2013.01); *B60Q 9/008* (2013.01); *G06V 20/58* (2022.01); *G08G 1/165* (2013.01); *B60W 2420/42* (2013.01)

(58) Field of Classification Search
CPC .......... B60W 30/095; B60W 2420/42; G06V 20/58; B60Q 9/008; G08G 1/165
See application file for complete search history.

(56) References Cited

U.S. PATENT DOCUMENTS

| 9,824,585 B2 | 11/2017 | Takeuchi | |
|---|---|---|---|
| 2009/0212930 A1* | 8/2009 | Pfeiffer | B62D 15/029 701/41 |
| 2015/0353081 A1* | 12/2015 | Kaminade | B60W 30/08 701/1 |
| 2018/0345960 A1* | 12/2018 | Fujii | B60W 30/0953 |
| 2019/0073906 A1* | 3/2019 | Matsunaga | B60W 30/0953 |
| 2019/0308617 A1* | 10/2019 | Groult | B60Q 1/50 |
| 2020/0114821 A1* | 4/2020 | Kim | B60Q 1/381 |
| 2020/0216063 A1* | 7/2020 | Lim | B60W 30/09 |
| 2021/0166564 A1* | 6/2021 | Takaki | G08G 1/167 |

FOREIGN PATENT DOCUMENTS

| DE | 102010053350 A1 * | 6/2012 | ......... B60R 21/0134 |
|---|---|---|---|
| EP | 3514012 A1 * | 7/2019 | |
| JP | 2014-085711 A | 5/2014 | |

* cited by examiner

*Primary Examiner* — Peter D Nolan
*Assistant Examiner* — Demetra R Smith-Stewart
(74) *Attorney, Agent, or Firm* — Christopher G. Darrow; Darrow Mustafa PC

(57) ABSTRACT

Systems, methods, and other embodiments described herein relate to improving alert activation for rear collision avoidance. In one embodiment, a method includes, responsive to detecting a target object that is located behind a subject vehicle, determining, by the subject vehicle, characteristics about the target object. The method includes modifying a collision threshold for activating an alert directed to the target object according to the characteristics.

20 Claims, 10 Drawing Sheets

SYSTEMS AND METHODS FOR SELECTIVELY MODIFYING COLLISION ALERT THRESHOLDS

TECHNICAL FIELD

The subject matter described herein relates in general to systems and methods for rear-end pre-collision safety alerts, and, more particularly, to modifying a collision threshold for activating the rear-end pre-collision alerts according to characteristics of an approaching object.

BACKGROUND

Vehicles may employ different safety systems to protect passengers, such as airbags, active/passive restraints, automated control assistance (e.g., anti-lock braking systems (ABS)), and so on. While these systems improve the safety of the passengers, they do not generally function to improve the safety of the passengers with respect to surrounding threats (e.g., approaching vehicles). That is, the noted systems facilitate directly preventing crashes and/or protecting passengers against injury for the vehicle in which they are installed, but do not help other vehicles in the surrounding environment avoid collision hazards with the instant vehicle.

Thus, surrounding vehicles or other moving objects (e.g., bicycles) are generally left to their own abilities in avoiding accidents. However, in various circumstances, a subject vehicle may activate rear-end pre-collision alerts using hazard lights of the subject vehicle. Such systems may estimate paths of the other objects to determine when to activate the alerts. Accordingly, because actual paths cannot be predicted with absolute certainty, the systems may generate false alerts when, for example, a vehicle is at a greater distance, is approaching from a greater angle, and so on. As such, there is generally a need to better inform the surrounding vehicles in order to further ensure the safety of the subject vehicle.

SUMMARY

In one embodiment, example systems and methods associated with improving alert activation for rear collision avoidance are disclosed. As previously noted, accurately determining when to activate rear-collision alerts can be a difficult task that may result in false alerts. This may be especially true in instances where an approaching object, such as a vehicle, is far away or is approaching from an angle, and thus an estimation of the path of the approaching object includes greater uncertainty. As such, the system may activate an alert inappropriately because of the failure to accurately identify a path of the approaching vehicle, thereby degrading reliance on the alerts and also the efficacy of the alerts.

However, in one embodiment, a disclosed approach resolves difficulties with false alerts by adapting a collision threshold for activating the alerts according to characteristics about the approaching vehicle. For example, an ability of the subject vehicle to accurately estimate a future path of the approaching vehicle/object may degrade as an angle of approach and/or a distance to the subject vehicle increases. In any case, the disclosed approach can better deliver alerts about potential collisions by accounting for the uncertainty associated with a future path of the approaching object through consideration of characteristics of the approaching object.

Therefore, in at least one arrangement, a subject vehicle implementing the disclosed approach detects a target object that is approaching the subject vehicle from a rear position while gathering information about the target object. The subject vehicle may then determine the characteristics of the target object from the sensor data, such as a predicted path of the approaching vehicle, a current speed, a current trajectory, and so on. According to the characteristics, the subject vehicle can, in one or more approaches, modify the collision threshold for activating an alert. For example, the subject vehicle may determine whether the distance of the target object is beyond a defined threshold distance. In further aspects, the subject vehicle may determine whether an angle of approach of the target object to the subject vehicle satisfies a particular value (e.g., greater than 2 degrees). In this way, the subject vehicle can determine whether the characteristics are indicative of the target object corresponding with greater uncertainty in identifying a future position.

In any case, when the subject vehicle judges the characteristics about the target object to satisfy a modification threshold, then the subject vehicle modifies the collision threshold to adapt how the alerts are generated. In one configuration, the subject vehicle modifies a latera position threshold. The lateral position threshold defines a lateral distance from the subject vehicle at which the target object may pass within which the subject vehicle will activate an alert. In this way, the subject vehicle can avoid generating false alerts and better provide the alerts to the target object to avoid collisions.

In one or more arrangements, a collision detection system is disclosed. The collision detection system includes one or more processors and a memory that is communicably coupled to the one or more processors. The memory stores a sensor module including instructions that when executed by the one or more processors cause the one or more processors to, responsive to detecting a target object that is located behind a subject vehicle, determine, by the subject vehicle, characteristics about the target object. The memory stores an alert module including instructions that when executed by the one or more processors cause the one or more processors to modify a collision threshold for activating an alert directed to the target object according to the characteristics.

In one or more arrangements, a non-transitory computer-readable medium is disclosed. The instructions include instructions to, responsive to detect a target object that is located behind a subject vehicle, determining, by the subject vehicle, characteristics about the target object. The instructions include instructions to modify a collision threshold for activating an alert directed to the target object according to the characteristics.

In one or more arrangements, a method is disclosed. The method may include, responsive to detecting a target object that is located behind a subject vehicle, determining, by the subject vehicle, characteristics about the target object. The method includes modifying a collision threshold for activating an alert directed to the target object according to the characteristics.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
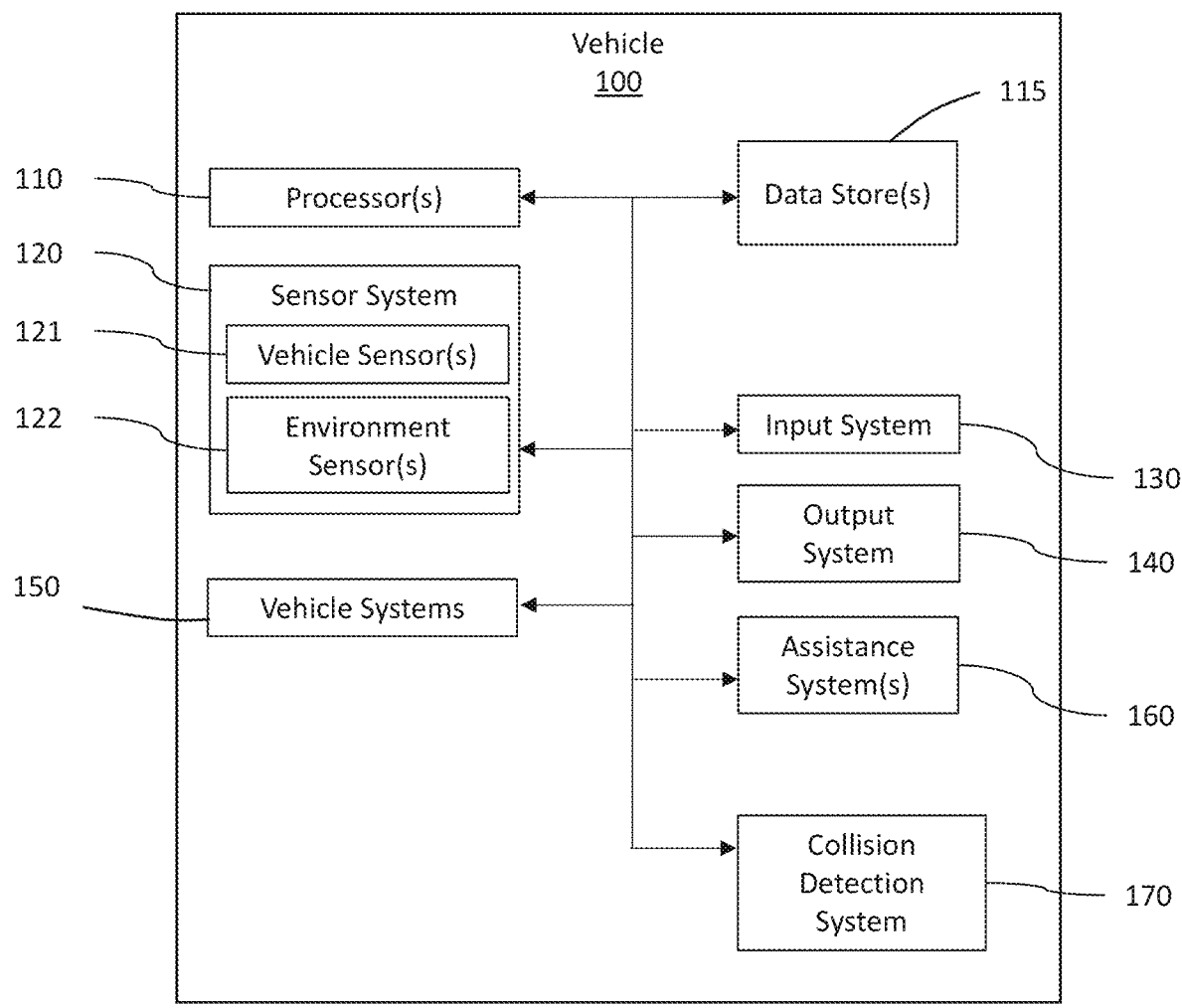
FIG. 1 illustrates one embodiment of a vehicle in which example systems and methods disclosed herein may operate.

Systems, methods, and other embodiments associated with improving alert activation for rear collision avoidance are disclosed. As previously noted, accurately determining when to activate rear-collision alerts can be a difficult task that may result in false alerts. This may be especially true in instances where a target object, such as an approaching vehicle, is far away or is approaching from an angle. Estimating the path in these circumstances can lead to false positives because of intrinsic uncertainty that is present when the angle or distance is greater. That is, estimating a path out to a longer horizon or according to a more severe angle of approach means that the estimate is intrinsically contemplating a scenario with a greater extent of unknown attributes that may occur over the evolution of the path. As such, the system may activate an alert inappropriately because of the uncertainty within an estimated path of the target object, thereby degrading reliance on the alerts and also the efficacy of the alerts.

However, in one embodiment, a disclosed approach resolves difficulties with false alerts by adapting a collision threshold for activating the alerts according to characteristics about the approaching vehicle. For example, an ability of the subject vehicle to accurately estimate a future path of the approaching vehicle/object may degrade as an angle of approach and/or a distance to the subject vehicle increases. In any case, the disclosed approach can better deliver alerts about potential collisions by accounting for uncertainty associated with a future path of the target object through consideration of characteristics of the approaching object.

Therefore, in at least one arrangement, a subject vehicle implementing the disclosed approach detects a target object that is approaching the subject vehicle from a substantially rear position while gathering information about the target object. The subject vehicle may then determine characteristics of the target object from the sensor data, such as a predicted path of the approaching vehicle, a current speed, a current trajectory, and so on. According to the characteristics, the subject vehicle can, in one or more approaches, modify the collision threshold for activating an alert. For example, the subject vehicle may determine whether the distance of the target object is beyond a defined threshold distance. In further aspects, the subject vehicle may determine whether an angle of approach of the target object to the subject vehicle satisfies a particular value (e.g., greater than 2 degrees).

When the subject vehicle judges the characteristics about the target object to satisfy a modification threshold, then the subject vehicle modifies the collision threshold to adapt how the alerts are generated. In one configuration, the subject vehicle modifies a subcomponent of the collision threshold, such as a lateral position threshold. The lateral position threshold defines a lateral distance from the subject vehicle at which the target object may pass within to activate an alert. The subject vehicle may adapt the lateral position threshold progressively according to particular values of the distance or approach angle to provide an adjustment that corresponds with the characteristics. In this way, the subject vehicle can avoid generating false alerts and better provide the alerts to the target object to avoid collisions.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of transport that benefits from the functionality discussed herein. It should be appreciated that the vehicle 100 is generally referred to as the subject vehicle 100 herein in order to further identify the vehicle 100 as the entity that is providing the alerts.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-10 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In either case, the vehicle 100 includes a collision detection system 170 that functions to improve rear-collision alerts. Moreover, while depicted as a standalone component, in one or more embodiments, the collision detection system 170 is integrated with the assistance system 160, or another similar system of the vehicle 100 as a sub-component thereof. The noted functions and methods will become more apparent with a further discussion of the figures.

Figure 2:
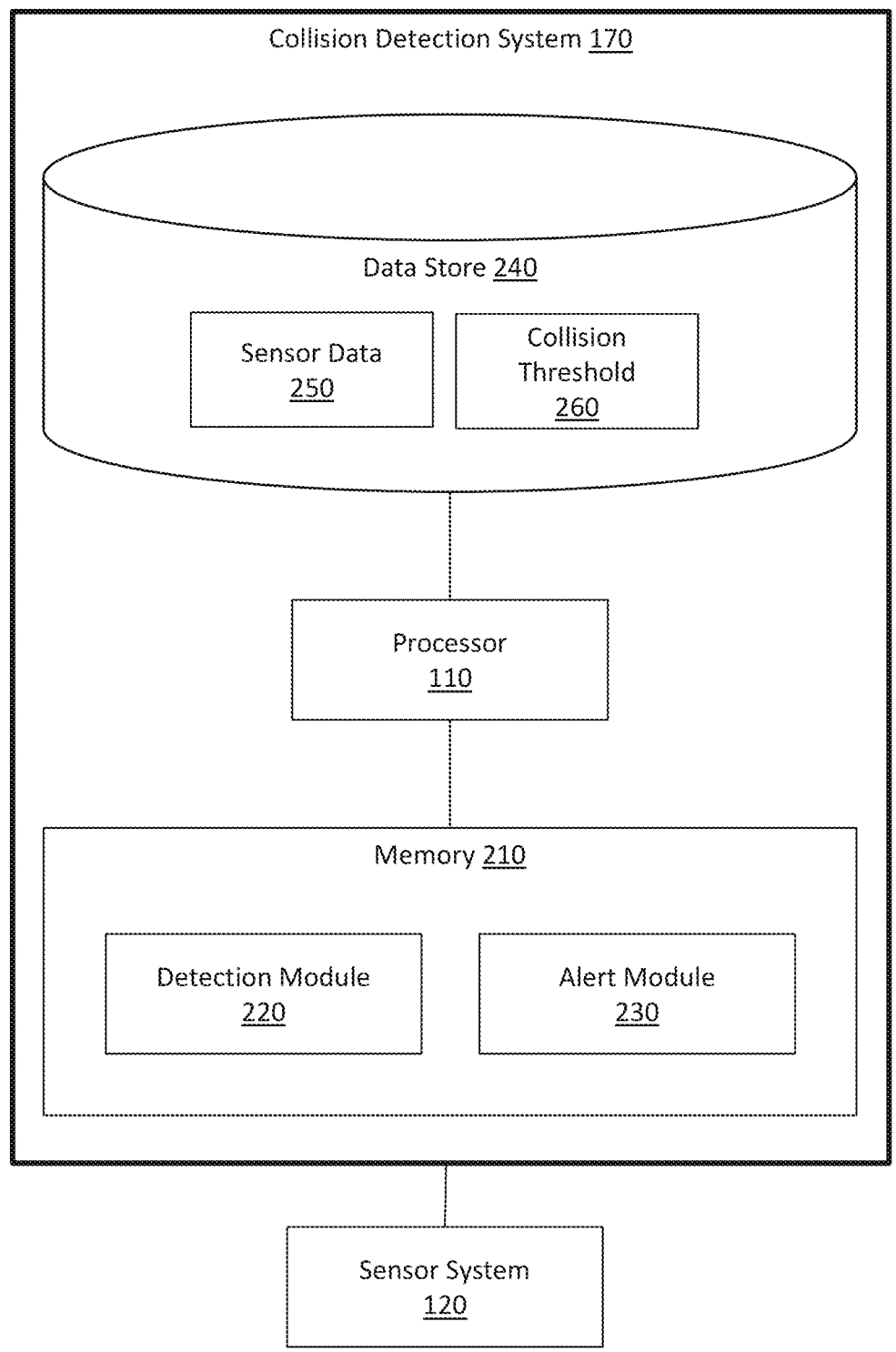
FIG. 2 illustrates one embodiment of a collision detection system that is associated with improving alert activation for rear collision avoidance.

With reference to FIG. 2, one embodiment of the collision detection system 170 is further illustrated. As shown, the collision detection system 170 includes a processor 110. Accordingly, the processor 110 may be a part of the collision detection system 170, or the collision detection system 170 may access the processor 110 through a data bus or another communication pathway. In one or more embodiments, the processor 110 is an application-specific integrated circuit that is configured to implement functions associated with a detection module 220 and an alert module 230. More generally, in one or more aspects, the processor 110 is an electronic processor such as a microprocessor that is capable of performing various functions as described herein when executing encoded functions associated with the collision detection system 170.

In one embodiment, the collision detection system 170 includes a memory 210 that stores the detection module 220 and the alert module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein. While, in one or more embodiments, the modules 220 and 230 are instructions embodied in the memory 210, in further aspects, the modules 220 and 230 include hardware, such as processing components (e.g., controllers), circuits, etcetera for independently performing one or more of the noted functions.

Furthermore, in one embodiment, the collision detection system 170 includes a data store 240. The data store 240 is, in one embodiment, an electronically-based data structure for storing information. In one approach, the data store 240 is a database that is stored in the memory 210 or another suitable storage medium, and that is configured with routines that can be executed by the processor 110 for analyzing stored data, providing stored data, organizing stored data, and so on. In any case, in one embodiment, the data store 240 stores data used by the modules 220 and 230 in executing various functions. In one embodiment, the data store 240 includes sensor data 250, and collision threshold 260 along with, for example, other information that is used by the modules 220 and 230.

Accordingly, the detection module 220 generally includes instructions that function to control the processor 110 to acquire data inputs from one or more sensors (e.g., the LiDAR sensor 123) of the vehicle 100 that form the sensor data 250. In general, the sensor data 250 includes information that embodies observations of the surrounding environment of the vehicle 100. The observations of the surrounding environment, in various embodiments, can include surrounding lanes, vehicles, objects, obstacles, etc. that may be present in the lanes, proximate to a roadway, within a parking lot, garage structure, driveway, or another area within which the vehicle 100 is operating.

While the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250. Thus, the sensor data 250, in one embodiment, represents a combination of perceptions acquired from multiple sensors.

Figure 3:
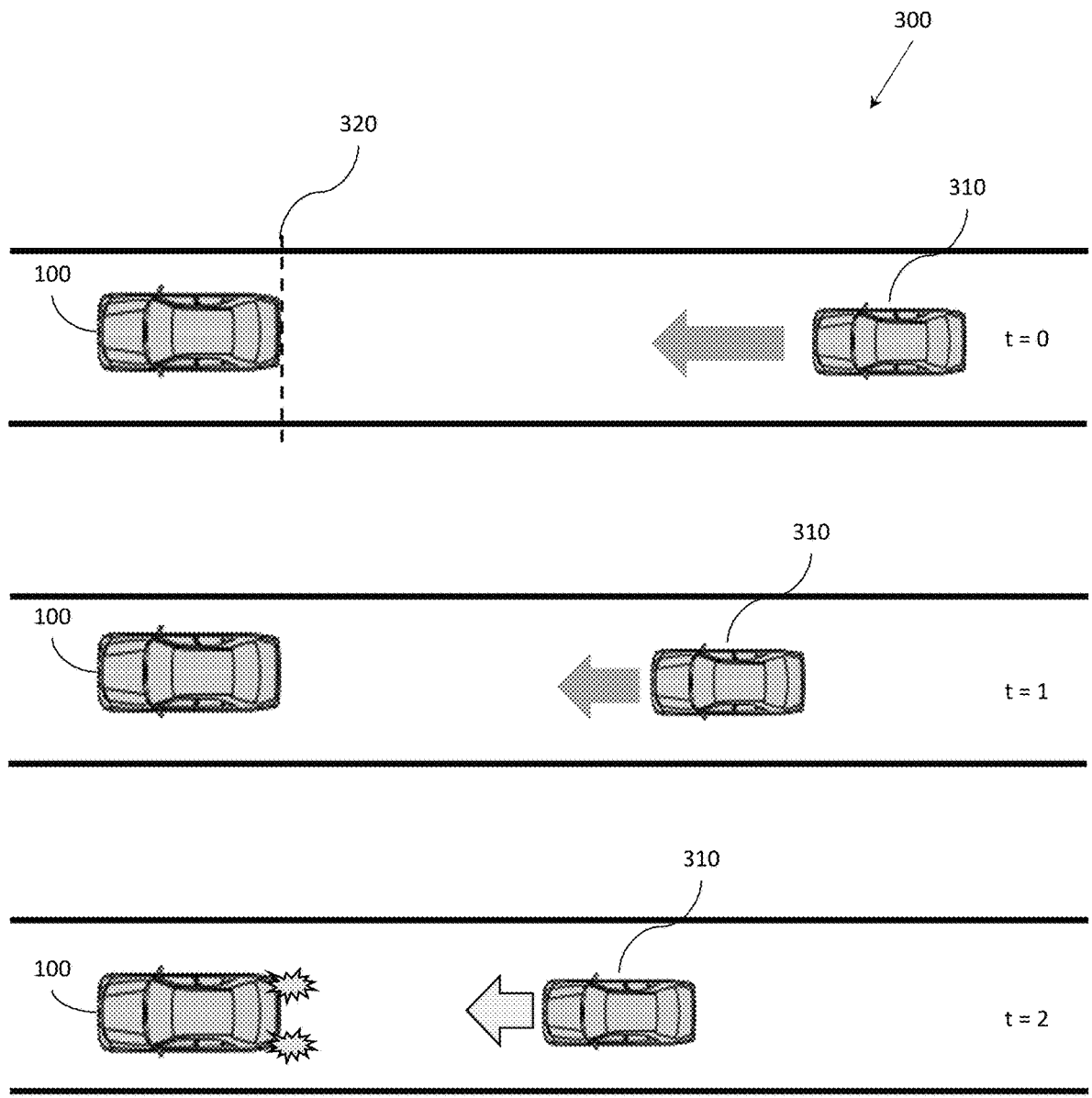
FIG. 3 illustrates one example scenario of a rear-collision alert.

Thus, whether the sensor data 250 is derived from a single sensor or multiple sensors, the sensor data 250 is comprised of information about a surrounding environment from which the collision detection system 170 can derive determinations about potential collisions and generate alerts in an attempt to thwart such collisions. As a preliminary explanation of the general premise of providing rear-collision avoidance alerts, FIG. 3 will now be addressed. FIG. 3 illustrates a series of relative positions 300 between the subject vehicle 100 and a target vehicle 310 that is approaching the subject vehicle from a rear position. Thus, as shown, the two vehicles may be traveling within a common lane of a roadway, or the subject vehicle 100 may be currently parked while the target vehicle 310 approaches. In either case, the scenario depicted in FIG. 3 is intended to represent an example instance of when the collision detection system 170 generates an alert.

Accordingly, at time t=0, the subject vehicle 100 may initially acquire sensor data 250 about the target vehicle 310 from which the subject vehicle 100 may derive a speed, position, etc. and estimate a path (i.e., a future trajectory) of the target vehicle 310. At time t=1, the target vehicle 310 continues to approach the subject vehicle 100; however, according to defined thresholds of the collision detection system 170, no alert is provided. The defined thresholds may correspond to the collision threshold 260, which, in one or more arrangements, includes a lateral position threshold and a time-to-collision (TTC) threshold. The lateral position threshold indicates a lateral distance extending out from the subject vehicle 100 along a line 320 projecting parallel with the rear end of the vehicle 100 within which the estimated path of the target vehicle 100 is considered insufficient or, in other words, is dangerously close to a collision or will collide. The TTC threshold indicates a time until the target vehicle 310 is estimated to reach the rear end of the subject vehicle 100, as defined by the line 320.

Accordingly, as shown at time t=2, once the collision detection system 170 determines that the target vehicle 310 satisfies the collision threshold 260, then the collision detection system 170 generates the alert. As shown in FIG. 3, the subject vehicle 100 flashes hazard lights (FHL) to warn the target vehicle 310. Of course, in further arrangements, the particular form of the alert itself may vary, but the collision detection system 170 generally forms the alert using an existing mechanism on the exterior of the subject vehicle 100 in order to convey the alert to the target vehicle 100 without a specific need for additional hardware, such as additional lights, communication devices/protocols, and so on. Accordingly, the collision detection system 170 forms the alert to warn the target vehicle 310, thereby facilitating avoidance of a rear-end collision with the subject vehicle 100.

Returning to the discussion of FIG. 2, the detection module 220 functions to acquire the sensor data 250 and then further process the sensor data 250 into information that the alert module 230 uses to modify the collision threshold and/or generate alerts. For example, the detection module 220 may identify object instances, classify the object instances, determine characteristics (e.g., speed, position, etc.) of the object instances, and so on using the sensor data 250.

As used herein, characteristics of the target object (e.g., an approaching vehicle) can include position, speed, a semantic class, a width, and so on. In a further aspect, the characteristics are defined to include derived information, such as an estimated path, a position history, prior speeds, etc. Once the detection module 220 determines the noted aspects from the sensor data 250, the alert module 230, in one or more arrangements, then selectively modifies the collision threshold 260. For example, the alert module 230 may modify the collision threshold 260 according to the distance of the target object from the subject vehicle 100. That is, depending on how far the target object is from the subject vehicle 100, the alert module 230 may modify the collision threshold 260 to better provide alerts by avoiding false alerts. In particular, adjusting the collision threshold 260 according to the distance better accounts for uncertainty in an estimated path of the target object, thereby avoiding false alerts.

In a further configuration, the alert module 230 adjusts the collision threshold 260 according to the angle of approach, the speed, or, more generally, the estimated path. Thus, depending on particular values (e.g., approach angle greater than 2 degrees) of the noted characteristics, the alert module 230 may adapt the collision threshold 260 to avoid false positives.

In one or more approaches, the alert module 230 determines whether the identified extent of the distance and/or the angle satisfies a modification threshold. The modification threshold, in one or more arrangements, defines a distance and/or angle at which the alert module 230 modifies the collision threshold 260. In further approaches, the modification threshold may define separate sets of values along with which an extent of the adjustment may also be defined. The distance may indicate a point (e.g., 30 m) beyond which the collision threshold 260 is to be adapted. The noted point may correspond with a point at which errors in the sensor data 250 and corresponding determinations therefrom (e.g., estimated path) exceed a reliability metric. In another arrangement, the collision detection system 170 defines the modification threshold as a particular degree of approach for the target object beyond which the alert module 230 modifies the lateral position threshold. For example, where the angle is beyond two degrees, the alert threshold may reduce the lateral position threshold. This is because the target object is less likely to collide with the subject vehicle 100 and likely indicates the target object is turning away from the subject vehicle 100. In still further aspects, the alert module 230 may also consider the estimated path or aspects of the estimated path, such as a speed of the target object when determining whether to modify the collision threshold 260 or an extent to modify the collision threshold 260.

Accordingly, as part of deriving the characteristics from the sensor data 250, the detection module 220 may estimate a path of the target object. To estimate the path, the detection module 220 may collect a position history of the target object. The position history includes observations of prior positions of the target object. In one approach, the position history may further include speeds at the separate points in time. From the position history, the detection module 220 estimates a future trajectory of the target object as the estimated path that is provided out to a prediction horizon (e.g., 2.0 seconds into the future). Of course, while the detection module 220 may use the position history to estimate the path, in further approaches, the detection module 220 may provide an instantaneous estimate according to a single observation. In any case, the estimated path generally describes where the target object is expected to move out to the prediction horizon in order to assess whether the target object is going to collide with the subject vehicle 100.

Turning to the collision threshold 260, in various approaches, the collision threshold 260 may include multiple separate components. For example, in at least one approach, the collision threshold includes a TTC threshold and a lateral position threshold. Of course, in various arrangements, the particular set of subcomponents included within the collision threshold 260 may vary. For example, in one arrangement, the collision threshold 260 may further include a speed threshold.

In any case, the TTC threshold defines a time until the target object is estimated to reach/collide with the subject vehicle 100. As discussed in relation to FIG. 3, the collision detection system 170 generally defines the TTC according to a line that is parallel with the rear end of the subject vehicle 100. Thus, when the target object reaches a distance from the subject vehicle 100 that corresponds with a defined time of the TTC threshold, then the alert module 230 determines that the target object satisfies the TTC threshold. The TTC threshold may have different values depending on the characteristics of the target object (e.g., speed, estimated path, etc.) from which the alert module 230 may dynamically modify the TTC threshold.

The lateral position threshold defines a lateral distance from the subject vehicle 100 within which the target object passing is considered to be too close and likely to collide. Thus, the lateral position threshold generally defines a distance extending from a centerline of the vehicle outward laterally from the subject vehicle 100, and that is generally defined in relation to a rearward-most aspect of the subject vehicle 100. In various approaches, the alert module 230 may implement different aspects as part of the collision threshold 260 and thus may modify the collision threshold 260 differently according to the implementation. In any case, the alert module 230, in various implementations, modifies the collision threshold 260 for activating an alert to the target object. Thus, the modification threshold generally defines when the distance and/or the angle of approach for the target object are sufficient to perform the modifying.

As set forth above, the alert module 230 uses the characteristics derived from the sensor data 250 to make the determination about modifying the collision threshold 260 and then uses the collision threshold 260 to determine when to activate the alert to the target object. As one example, the alert module 230 may activate the alert when the target object satisfies the TTC threshold (e.g., the target object is less than 1.5 seconds from colliding) and the lateral position threshold (e.g., the estimated path passes within 1.5 m) when the distance is less than 30 m or the angle of approach is less than two degrees. By contrast, in one configuration, where the angle of approach is greater than two degrees or the distance is greater than 30 m, then the alert module 230 considers different values for the lateral position threshold (e.g., 1 m-0 m).

Figure 4:
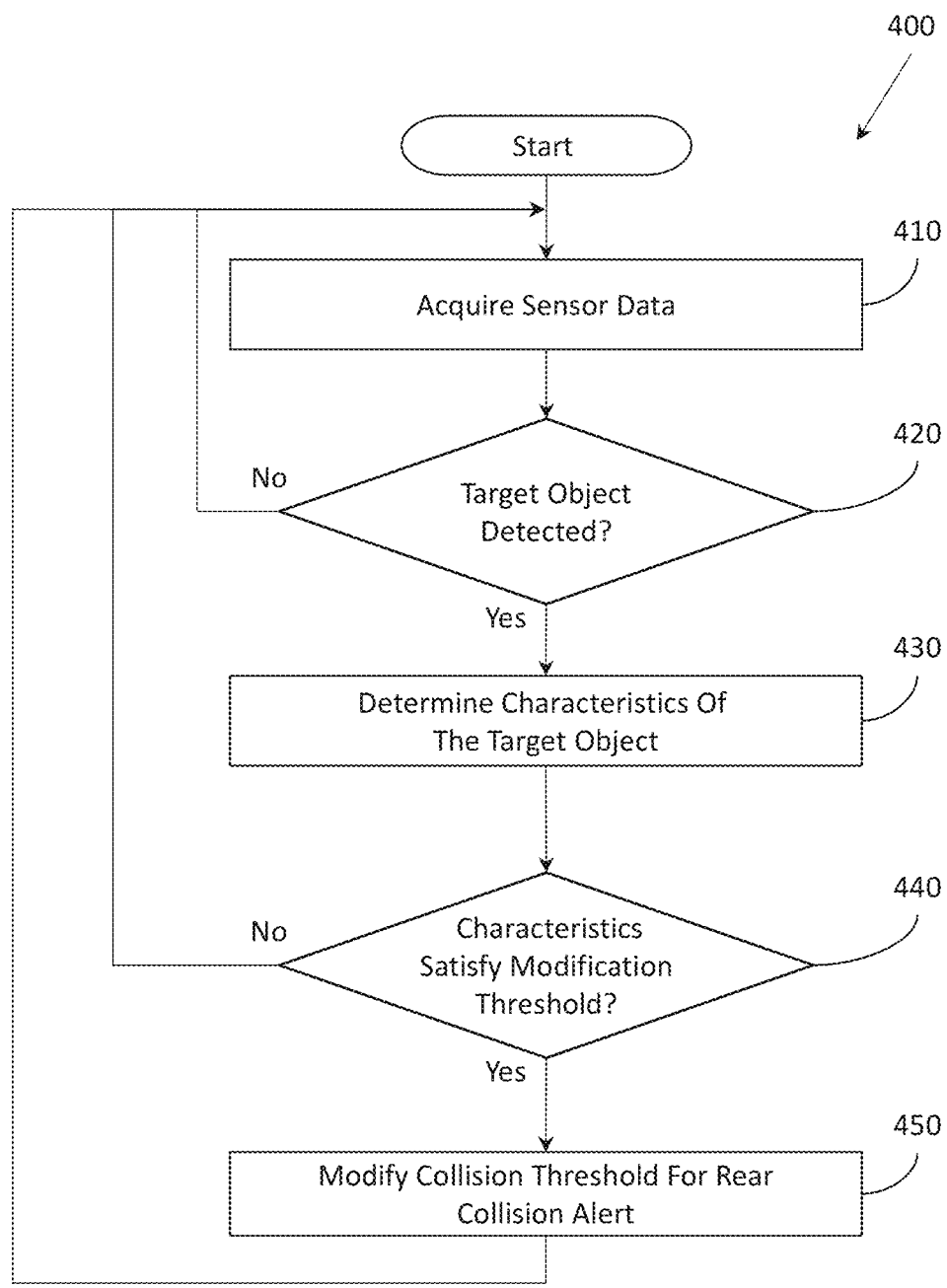
FIG. 4 illustrates one embodiment of a method associated with modifying a collision threshold for providing rear-collision alerts.

Additional aspects of improving alerts for rear-collision avoidance will be discussed in relation to FIG. 4. FIG. 4 illustrates a method 400 associated with modifying a collision threshold according to lateral free space. Method 400 will be discussed from the perspective of the collision detection system 170 of FIG. 1. While method 400 is discussed in combination with the collision detection system 170, it should be appreciated that the method 400 is not limited to being implemented within the collision detection system 170 but is instead one example of a system that may implement the method 400.

At 410, the detection module 220 acquires sensor data 250 from at least one sensor of the subject vehicle 100. In one embodiment, the detection module 220 acquires the sensor data 250 about a surrounding environment of the vehicle 100. As previously noted, the detection module 220, in one or more implementations, iteratively acquires the sensor data 250 from one or more sensors of the sensor system 120 to which the collision detection system 170 is communicatively coupled. The sensor data 250 includes observations of a surrounding environment of the subject vehicle 100, including regions behind and extending laterally outward from the vehicle. As noted previously, the detection module 220 acquires the sensor data 250 and may fuse observations from different sensors together in order to provide comprehensive information about the surrounding environment.

At 420, the detection module 220 detects whether a target object is located behind the subject vehicle 100. In general, the detection module 220 processes the sensor data 250 according to one or more routines, such as machine learning algorithms that identify separate instances of objects in the surrounding environment and may further classify the instances according to a classifier to identify a semantic class. Moreover, the detection module 220 is processing the sensor data 250 to generally identify separate aspects of the surrounding environment and determine whether the target object is at a rearward location of the subject vehicle 100.

At 430, the detection module 220 determines characteristics about the surrounding environment of the subject vehicle 100, including about the target object. That is, in at least one arrangement, the detection module 220 uses the sensor data 250 about the target object to determine a position, speed, a target width of the target object, and so on. It should be appreciated that the target object may take different forms, such as a passenger vehicle (e.g., sedan), a pick-up truck, a motorcycle, a bicycle, a semi-truck, a van, and so on. Accordingly, in order to facilitate further determinations, the detection module 220 may also store characteristics for a previous x number of time steps (e.g., previous acquisitions of the sensor data 250 about the target object).

Thus, in various implementations, as part of determining the characteristics, at 430, the detection module 220 analyzes the characteristics to estimate a path of the target object. The detection module 220 may use the previously acquired and stored information when estimating the path in order to improve the estimation. That is, in one configuration, the detection module 220 may directly extrapolate a current heading and speed of the target object in order to provide a coarse estimate of the future path of the target object. By contrast, in a further approach, the detection module 220 may provide a projected trajectory that predicts more complex maneuvers that better indicate likely curvatures of the future path. In any case, the detection module 220 is estimating the path of the target object to identify when and where the target object is likely to pass by or collide with the subject vehicle 100. From this estimate, the detection module 220 may determine a TTC, a side of the vehicle to which the target object may pass, and so on. In any case, all of the information gathered and derived, at 430, functions to inform the alert module 230 about whether to modify the collision threshold and whether to activate an alert, as discussed further subsequently.

At 440, the alert module 230 determines whether the characteristics satisfy the modification threshold. In one embodiment, the alert module 230 determines whether the distance and/or the angle of approach satisfy the modification threshold. In general, as used herein, satisfying a noted threshold refers to equaling or exceeding a defined limit. Of course, in further arrangements, satisfying the threshold may refer to meeting multiple criteria, exceeding a minimum, exceeding a maximum, and so on. Moreover, satisfying the modification threshold may indicate a starting point for modifying the collision threshold 260. Thus, this determination may not be purely binary but instead may consider different scenarios, such as an extent to which certain characteristics exceed a threshold value and/or values for combinations of characteristics. Therefore, the alert module 230 may compare the characteristics, such as the distance and/or the angle, with defined values that are the modification threshold. In any case, when the alert module 230 determines that the characteristics do not satisfy the modification threshold, then the collision detection system 170 repeats the process of acquiring the sensor data 250 and performing the other noted steps according to newly acquired information. When the alert module 230 determines that the characteristics do satisfy the modification threshold, then the alert module 230 proceeds to modify the collision threshold 260 at block 460.

At 460, the alert module 230 modifies the collision threshold 260 for activating an alert to the target object. In one embodiment, the alert module 230 adapts a lateral position threshold. In general, the alert module 230 may modify the collision threshold 260 according to a spectrum of potential values that depend directly on the specific value or combination of values for the characteristics. For example, the alert module 230 may adjust the lateral position threshold according to a defined linear progression and limits. As will be described further subsequently, the alert module 230, in at least one approach, adjusts the lateral position threshold beginning at 60 m, which induces a progressive change until reaching 30 m. Similarly, the alert module 230 may adjust the lateral position threshold according to defined limits associated with the angle of approach. In yet a further embodiment, the alert module 230 determines a minimum of the lateral position threshold according to the angle and the distance and uses the minimum defined between the two. In this way, the collision detection system 170 better accounts for uncertainty in observations when generating the alerts and thereby avoids false positives.

Figure 5:
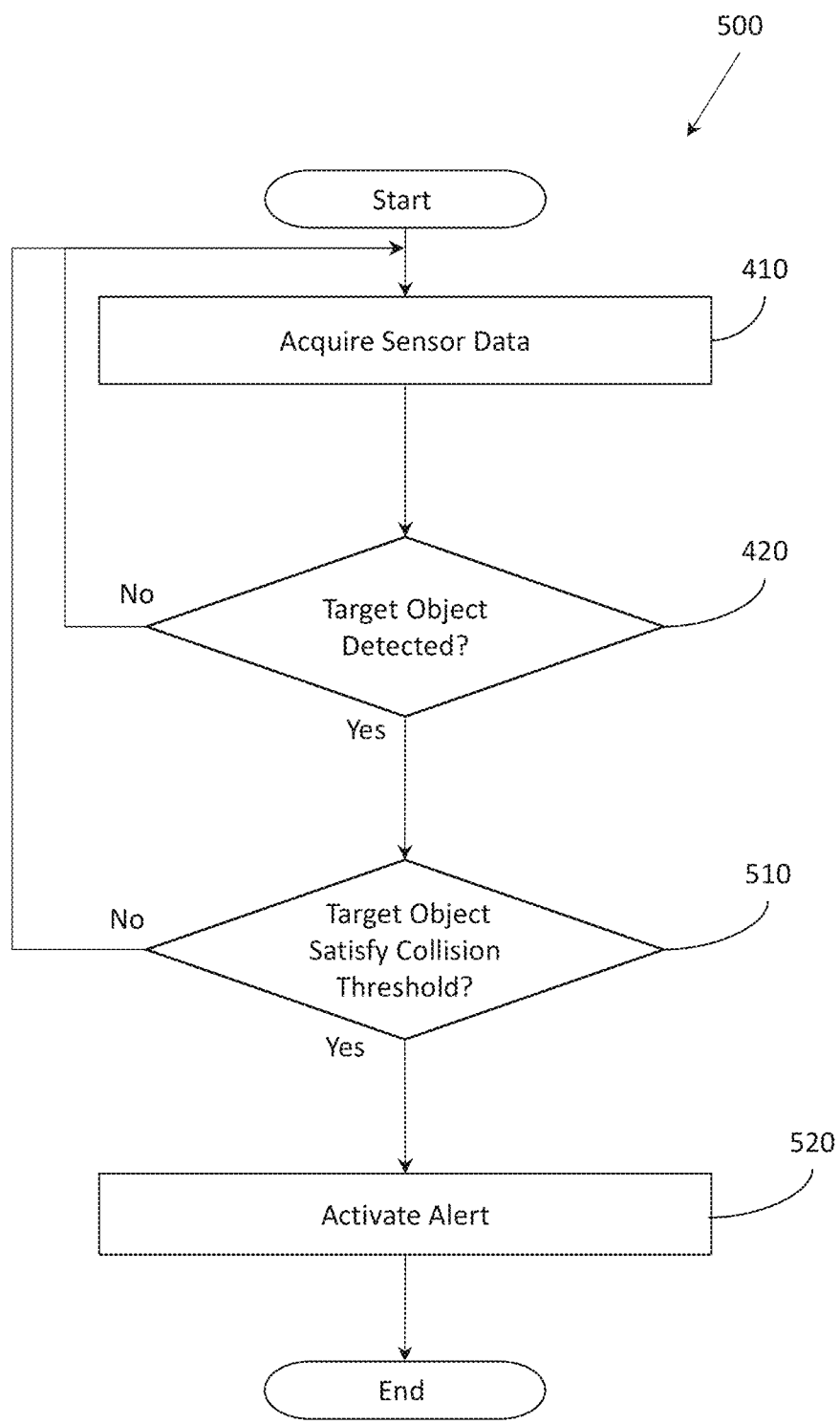
FIG. 5 illustrates one embodiment of a method associated with generating rear-collision alerts.

Aspects associated with generating an alert for rear-collision avoidance will be discussed in relation to FIG. 5. FIG. 5 illustrates a method 500 associated with generating an alert according to a collision threshold that may be dynamically modified based, at least in part, on characteristics of the target object. Method 500 will be discussed from the perspective of the collision detection system 170 of FIG. 1. While method 500 is discussed in combination with the collision detection system 170, it should be appreciated that the method 500 is not limited to being implemented within the collision detection system 170 but is instead one example of a system that may implement the method 500.

Blocks 410 and 420 of the method 500 generally correspond to the same blocks of the method 400. Therefore, the description of the noted aspects will not be repeated herein. Moreover, it should be appreciated that the method 400 and the method 500 may execute in parallel as opposed to being serial processes. In any case, the alert module 230 uses the information about the target object in combination with the collision threshold 260 to determine whether to activate an alert to the target object.

At 510, the alert module 230 determines whether the characteristics of the target object satisfies the collision threshold 260. In one embodiment, the alert module 230 determines whether the estimated path of the target object satisfies (e.g., meets or exceeds) the lateral position threshold component of the collision threshold 260. Furthermore, the alert module 230 also determines if the target object satisfies the TTC threshold component of the collision threshold 260. In general, if the noted subcomponents are satisfied, then the alert module 230 considers the collision threshold 260 to be satisfied, and the process proceeds to block 520 and generating the alert. If the target object does not satisfy the collision threshold 260, then the collision detection system 170 repeats method 500.

At 520, the alert module 230 activates the alert to the target object. As noted, the alert itself may take different forms depending on the implementation. However, in general, the alert includes activating lights on the exterior of the subject vehicle 100, such as rear blinkers (i.e., hazard lights). Activating the lights, in this way, provides a direct visual indicator to an operator of the target object of a potential hazard of collision with the subject vehicle 100, thereby avoiding a potential collision.

Figure 6:
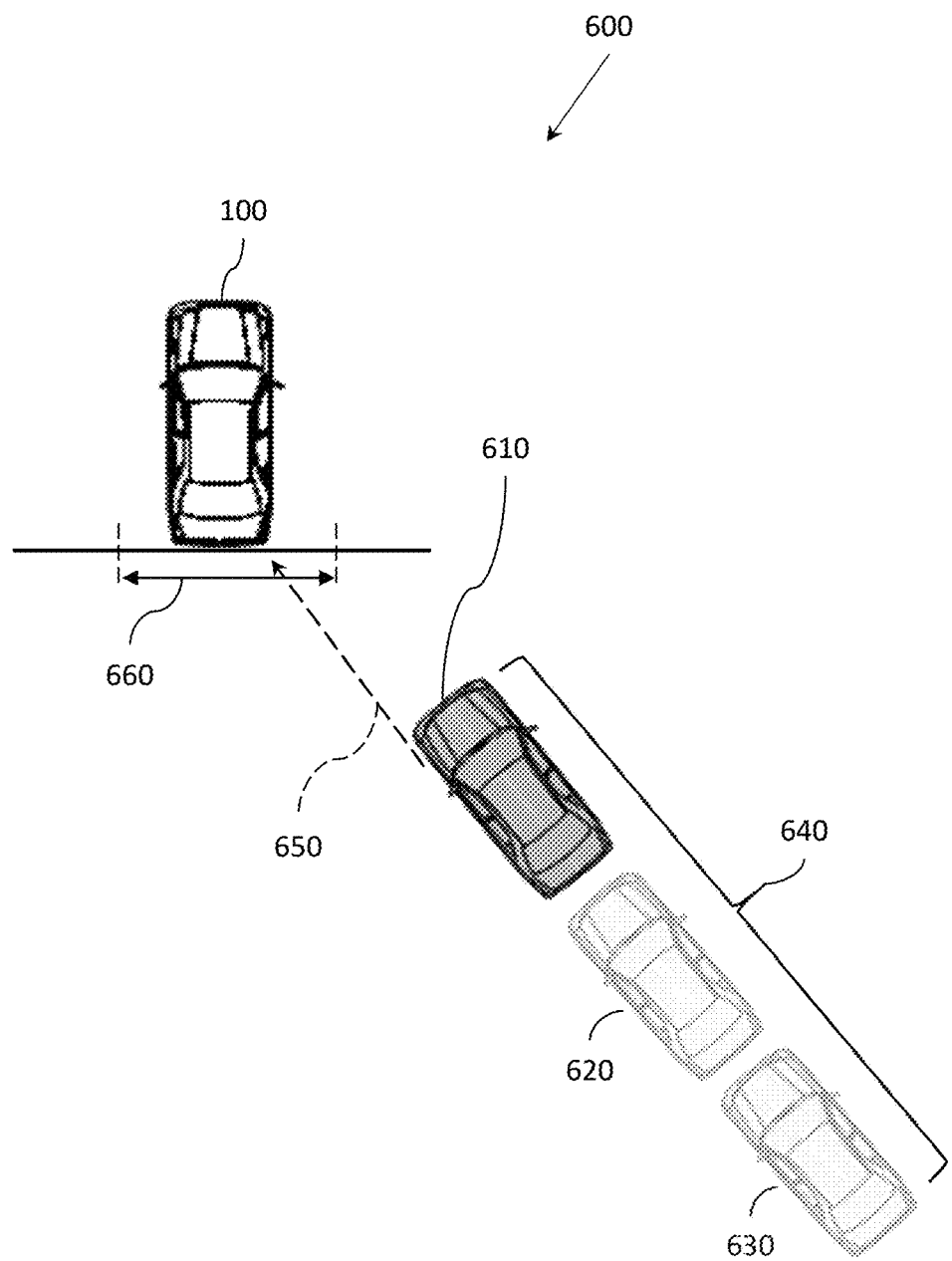
FIG. 6 illustrates an example scenario of a target object approaching a subject vehicle from a rear position.

As a further explanation of how the presently disclosed systems and methods function, consider FIGS. 6-10. FIG. 6 illustrates a general example 600 of the subject vehicle 100 with an approaching vehicle 610. As shown in FIG. 6, the collision detection system 170 tracks the approaching vehicle 610 by logging/storing information about prior positions 620 and 630 as a position history 640. Thus, for each of the separate instances of the position history 640, the collision detection system 170 acquires and logs at least a position and, in one approach, a speed of the approaching vehicle 100. Using this information, the collision detection system 170 estimates a path 650 of the approaching vehicle 610. The path 650 generally indicates a predicted future position of the approaching vehicle 610 relative to the subject vehicle 100. As shown in FIG. 6, the path 650 passes within the lateral position threshold 660. Thus, as illustrated, once the approaching vehicle 610 also satisfies the TTC threshold, then the collision detection system 170 activates the alert.

Figure 7:
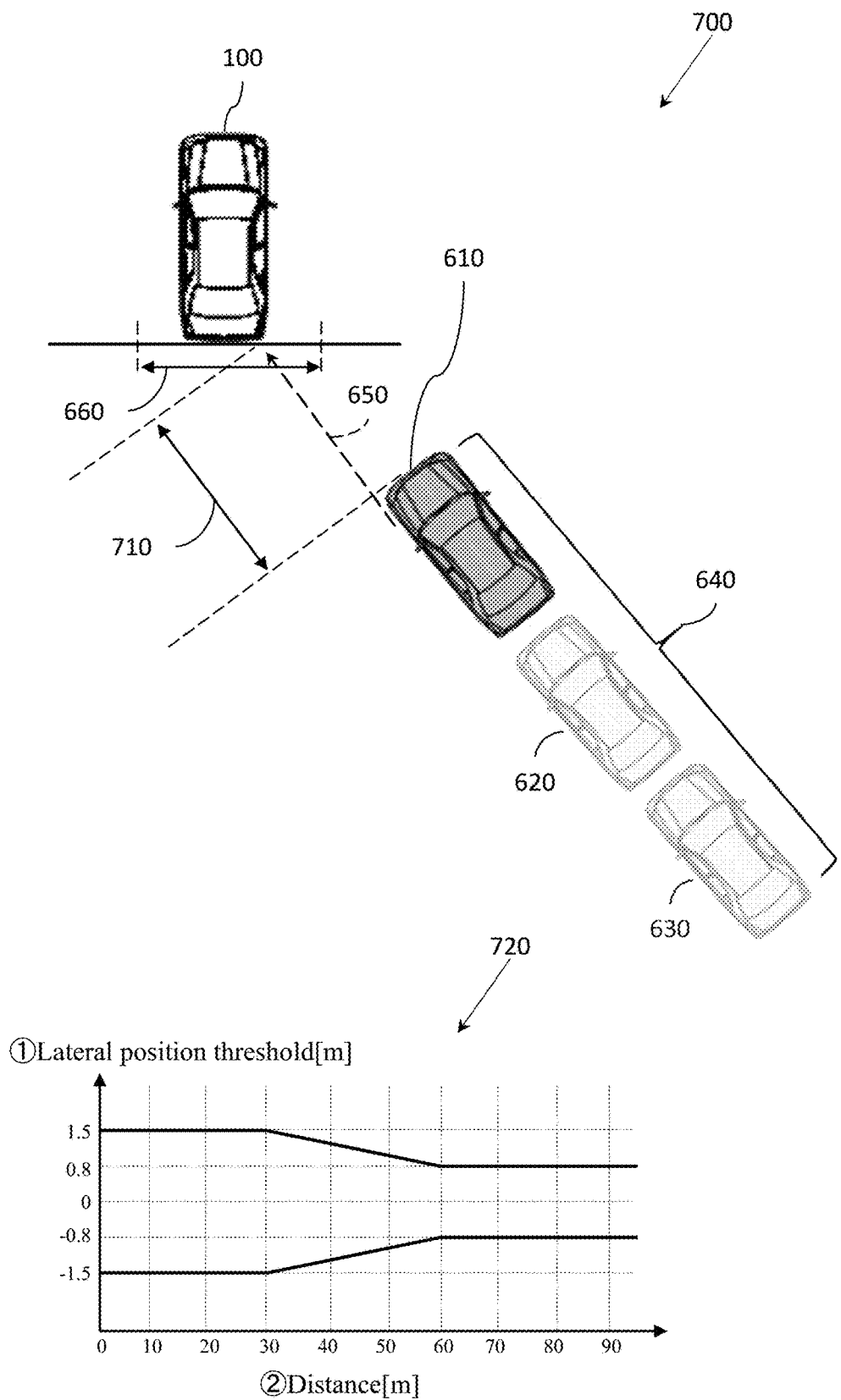
FIG. 7 illustrates an example of modifying a lateral position threshold according to a distance of a target object.

FIG. 7 illustrates an example 700 of how the collision detection system 170 modifies the lateral position threshold 660 according to a distance 710 of the approaching vehicle 610 from the subject vehicle 100. Graph 720 further depicts how the alert module 230 modifies the lateral position threshold relative to the distance. As shown, the alert module provides a small lateral position threshold at greater distances (e.g., above 30 m) since the uncertainty in predictions about the path at the greater distances increase. Accordingly, as the approaching vehicle 610 closes the distance 710 to the subject vehicle 100, the alert module gradually modifies the lateral position threshold, as shown in the graph 720. It should be appreciated that, in one or more arrangements, the lateral position threshold is defined relative to a width of the subject vehicle 100. That is, the collision detection system 170 is calibrated to the particular width in order to define the lateral position threshold with respect to the width of the subject vehicle 100 such that the value of "0" is considered within the width of the subject vehicle 100 itself while the defined distances of the lateral position threshold are distances extending laterally outward from an edge of the subject vehicle 100.

Figure 8:
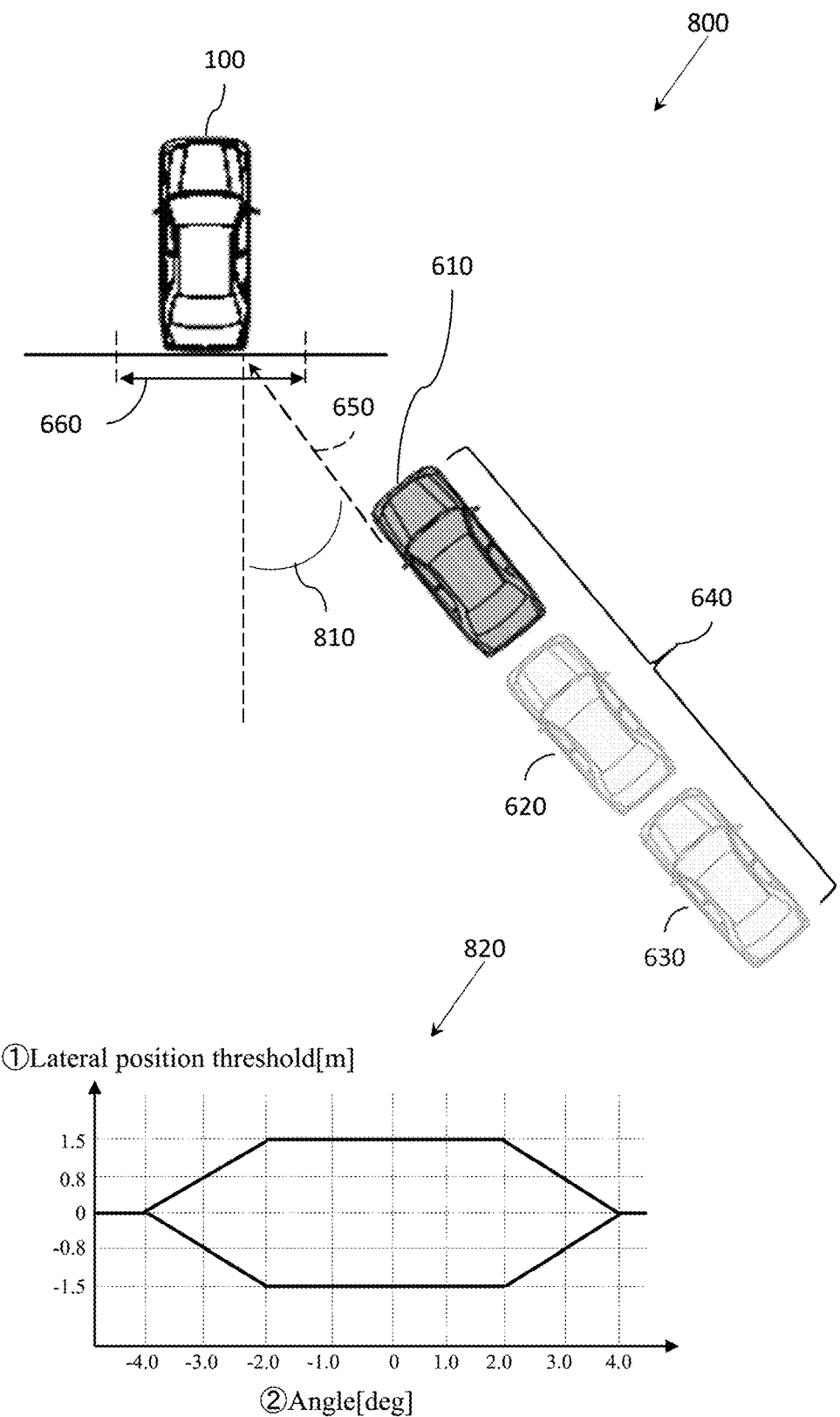
FIG. 8 illustrates an example of modifying a lateral position threshold according to an angle of an approaching target object.

FIG. 8 illustrates an example 800 of how the collision detection system 170 modifies the lateral position threshold 660 according to an angle 810. Graph 820 illustrates how the alert module 230 modifies the lateral position threshold according to the angle of approach of the target object (i.e., the approaching vehicle 610). As shown, when the angle of approach increases beyond two degrees, the alert module 230 progressively reduces the lateral position threshold until reaching zero at about four degrees. The alert module 230 defines the angle of approach according to a perpendicular line extending outward from a longitudinal axis of the vehicle and shifted to a point of intersection, as shown in example 800. In this way, the collision detection system 170 improves determinations about when to activate the alert.

Figure 9:
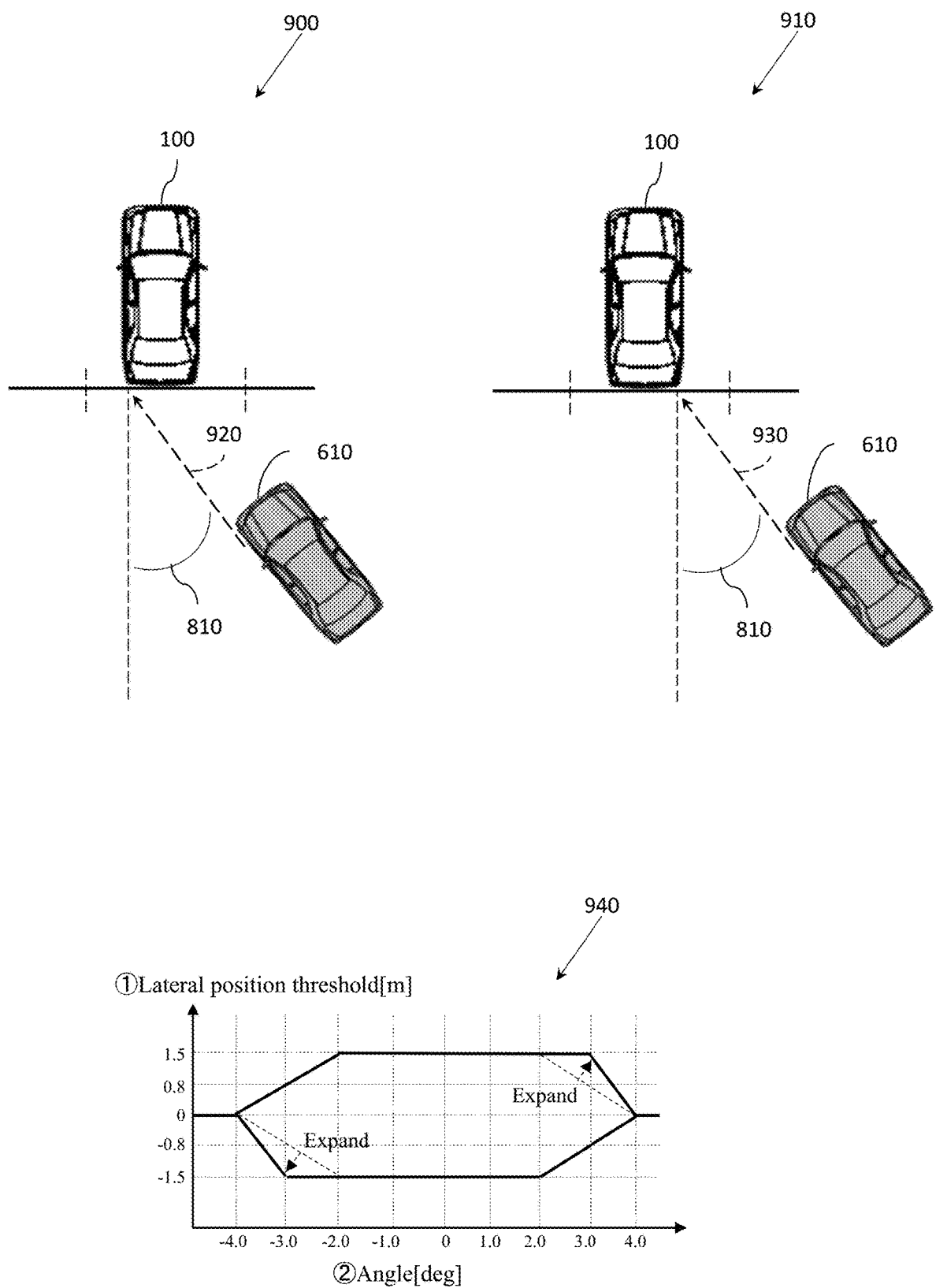
FIG. 9 illustrates an example of modifying a lateral position threshold according to an estimated path of a target object.

FIG. 9 illustrates two separate scenarios 900 and 910 where the approaching vehicle 610 approaches at the same angle 810 but with different respective paths 920 and 930. As shown in graph 940, the alert module 230 may expand the lateral position threshold depending on the particular angle of approach. That is, as shown, the alert module 230 adjusts the lateral position threshold differently depending on whether the angle is to a positive or negative. Moreover, the alert module 230, in at least one arrangement, generally considers the character of the estimated path 920/930 in relation to which side of the vehicle 100 the target object is approaching, the speed of the target object, a curvature of the path 920/930, and so on. In this way, the alert module 230 can further consider more complex aspects in order to better account for motion of the target object.

Figure 10:
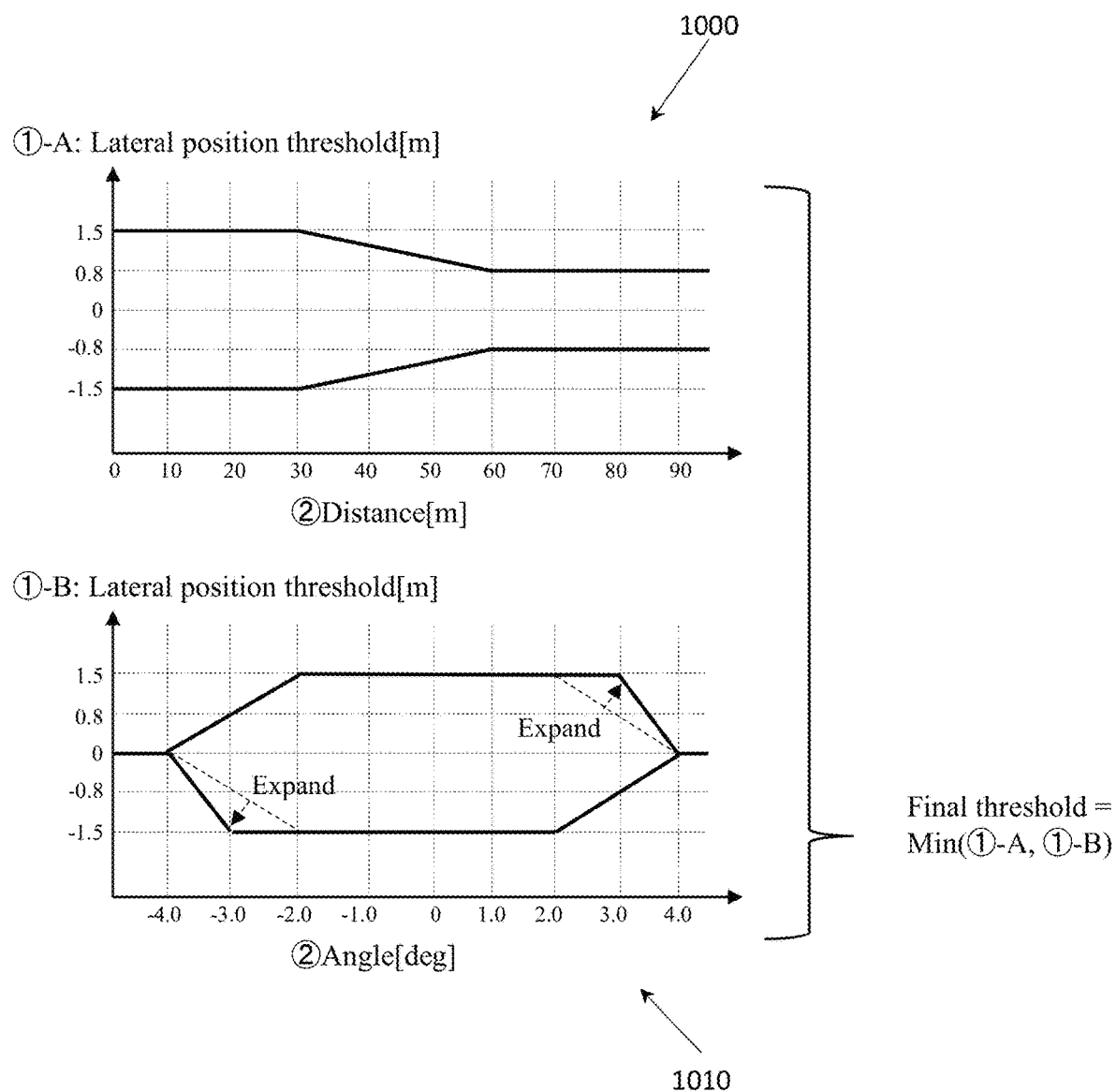
FIG. 10 illustrates an example of modifying a lateral position threshold according to an angle and/or a distance of an approaching target object.

FIG. 10 illustrates a combined approach to modifying the lateral position threshold in which the alert module 230 applies a minimum between the determination from the distance and the angle. As shown, FIG. 10 includes two separate graphs 1000 and 1010. The graph 1000 illustrates values for modifying the lateral position threshold according to the distance, whereas the graph 1010 illustrates values for modifying the lateral position threshold according to the angle. In this circumstance, the alert module 230 considers both the angle and the distance, and whichever corresponds to a smaller (i.e., minimum) value for the lateral position threshold is used to modify the collision threshold 260. In this way, the alert module 230 considers multiple factors and may further consider the additional aspects, such as speed, etc. to better determine how to modify the collision threshold 260 and when to activate the alert.

Additionally, it should be appreciated that the collision detection system 170 from FIG. 1 can be configured in various arrangements with separate integrated circuits and/or electronic chips. In such embodiments, the detection module 220 is embodied as a separate integrated circuit. Additionally, the alert module 230 is embodied on an individual integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In another embodiment, the modules 220 and 230 may be combined into a separate application-specific integrated circuit. In further embodiments, portions of the functionality associated with the modules 220 and 230 may be embodied as firmware executable by a processor and stored in a non-transitory memory. In still further embodiments, the modules 220 and 230 are integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the collision detection system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 250). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the collision detection system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the collision detection system 170, and/or the assistance system 160 may control some or all of these vehicle systems 150 and, thus, may be partially or fully autonomous.

The processor(s) 110, the collision detection system 170, and/or the assistance system 160 can be operatively connected to communicate with the various vehicle systems 150 and/or individual components thereof. For example, returning to FIG. 1, the processor(s) 110, the collision detection system 170, and/or the assistance system 160 can be in communication to send and/or receive information from the various vehicle systems 150 to control the movement, speed, maneuvering, heading, direction, etc. of the vehicle 100. The processor(s) 110, the collision detection system 170, and/or the assistance system 160 may control some or all of these vehicle systems 150.

The processor(s) 110, the collision detection system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the collision detection system 170, and/or the assistance system 160 can control the direction and/or speed of the vehicle 100. The processor(s) 110, the collision detection system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the collision detection system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more assistance system(s) 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160 either independently or in combination with the collision detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A collision detection system, comprising:
one or more processors;
a memory communicably coupled to the one or more processors and storing:
a detection module including instructions that, when executed by the one or more processors, cause the one or more processors to, responsive to detecting a target object that is located behind a subject vehicle, determine, by the subject vehicle, characteristics about the target object; and
an alert module including instructions that when executed by the one or more processors cause the one or more processors to modify a collision threshold for activating an alert directed to the target object according to the characteristics, and
activate the alert directed to the target object according to whether the target object satisfies the collision threshold, including activating rear lights of the subject vehicle.

2. The collision detection system of claim 1,
wherein the collision threshold defines at least one of a time-to-collision (TTC) threshold and a lateral position threshold, and wherein the target object is moving in a surrounding environment.

3. The collision detection system of claim 1, wherein the detection module includes instructions to determine the characteristics including instructions to estimate a path of the target object according to a position history of the target object, and wherein the path identifies one or more of a lateral position proximate to the subject vehicle at which the target object is to encounter the subject vehicle, and an angle of approach of the target object relative to the subject vehicle.

4. The collision detection system of claim 1, wherein the alert module includes instructions to modify the collision threshold including instructions to adapt a lateral position threshold according to a distance of the target object from the subject vehicle, and
wherein the alert module includes instructions to modify the collision threshold according to the distance avoids false activation of the alert directed to the target object.

5. The collision detection system of claim 1, wherein the alert module includes instructions to modify the collision threshold including instructions to adapt a lateral position threshold according to an angle of a path of the target object relative to the subject vehicle, and wherein the angle of the path is relative to a centerline of the subject vehicle.

6. The collision detection system of claim 1, wherein the alert module includes instructions to modify the collision threshold including instructions to adapt a lateral position threshold according to a distance and an angle of the target object, and
wherein the alert module includes instructions to modify the collision threshold according to the distance and the angle including instructions to determine a minimum for the lateral position threshold according to a first threshold based on the distance and a second threshold based on the angle.

7. The collision detection system of claim 1, wherein the detection module includes instructions to determine the characteristics including instructions to determine a target speed of the target object.

8. The collision detection system of claim 7, wherein the alert module includes instructions to modify the collision threshold including instructions to adapt the collision threshold according to an angle of the target object approaching the subject vehicle and the target speed.

9. A non-transitory computer-readable medium storing instructions that, when executed by one or more processors, cause the one or more processors to:
responsive to detecting a target object that is located behind a subject vehicle, determining, by the subject vehicle, characteristics about the target object; and
modify a collision threshold for activating an alert directed to the target object according to the characteristics; and
activate the alert directed to the target object according to whether the target object satisfies the collision threshold, including activating rear lights of the subject vehicle.

10. The non-transitory computer-readable medium of claim 9,
wherein the collision threshold defines at least one of a time-to-collision (TTC) threshold and a lateral position threshold, and wherein the target object is moving in a surrounding environment.

11. The non-transitory computer-readable medium of claim 9, wherein the instructions to determine the characteristics include instructions to estimate a path of the target object according to a position history of the target object, and
wherein the path identifies one or more of a lateral position proximate to the subject vehicle at which the target object is to encounter the subject vehicle, and an angle of approach of the target object relative to the subject vehicle.

12. The non-transitory computer-readable medium of claim 9, wherein the instructions to modify the collision threshold include instructions to adapt a lateral position threshold according to a distance of the target object from the subject vehicle, and
wherein the instructions to modify the collision threshold include instructions to modify the collision threshold according to the distance avoids false activation of the alert directed to the target object.

13. The non-transitory computer-readable medium of claim 9, wherein the instructions to modify the collision threshold include instructions to adapt a lateral position threshold according to an angle of a path of the target object relative to the subject vehicle, and
wherein the angle of the path is relative to a centerline of the subject vehicle.

14. A method, comprising:
responsive to detecting a target object that is located behind a subject vehicle, determining, by the subject vehicle, characteristics about the target object; and
modifying a collision threshold for activating an alert directed to the target object according to the characteristics; and
activating the alert directed to the target object according to whether the target object satisfies the collision threshold, including activating rear lights of the subject vehicle.

15. The method of claim 14,
wherein the collision threshold defines at least one of a time-to-collision (TTC) threshold and a lateral position threshold, and wherein the target object is moving in a surrounding environment.

16. The method of claim 14, wherein determining the characteristics includes estimating a path of the target object according to a position history of the target object, and
wherein the path identifies one or more of a lateral position proximate to the subject vehicle at which the target object is to encounter the subject vehicle, and an angle of approach of the target object relative to the subject vehicle.

17. The method of claim 14, wherein modifying the collision threshold includes adapting a lateral position threshold according to a distance of the target object from the subject vehicle, and
wherein modifying the collision threshold according to the distance avoids false activation of the alert directed to the target object.

18. The method of claim 14, wherein modifying the collision threshold includes adapting a lateral position threshold according to an angle of a path of the target object relative to the subject vehicle, and
wherein the angle of the path is relative to a centerline of the subject vehicle.

19. The method of claim 14, wherein modifying the collision threshold includes adapting a lateral position threshold according to a distance and an angle of the target object, and
wherein modifying the collision threshold according to the distance and the angle includes determining a minimum for the lateral position threshold according to a first threshold based on the distance and a second threshold based on the angle.

20. The method of claim 14, wherein determining the characteristics includes determining a target speed of the target object, and
wherein modifying the collision threshold includes adapting the collision threshold according to an angle of the target object approaching the subject vehicle and the target speed.

* * * * *